(12) United States Patent
Kondou et al.

(10) Patent No.: US 12,427,582 B2
(45) Date of Patent: Sep. 30, 2025

(54) CUTTING INSERT AND CUTTING TOOL

(71) Applicant: TUNGALOY CORPORATION, Fukushima (JP)

(72) Inventors: Yuma Kondou, Iwaki (JP); Jun Otsuka, Iwaki (JP); Katsura Mochizuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 436 days.

(21) Appl. No.: 17/656,534

(22) Filed: Mar. 25, 2022

(65) Prior Publication Data
US 2022/0347761 A1 Nov. 3, 2022

(30) Foreign Application Priority Data

Apr. 28, 2021 (JP) .................................. 2021-076442

(51) Int. Cl.
*B23B 27/16* (2006.01)
*B23B 29/04* (2006.01)

(52) U.S. Cl.
CPC ........ *B23B 27/1603* (2013.01); *B23B 29/043* (2013.01); *B23B 2200/04* (2013.01); *B23B 2200/048* (2013.01)

(58) Field of Classification Search
CPC ............ B23B 27/1603; B23B 2200/00; B23B 2200/04; B23B 2200/0423;
(Continued)

(56) References Cited

U.S. PATENT DOCUMENTS 6,942,434 B2 * 9/2005 Friedman ................ B23B 27/08
407/113
7,597,508 B2 * 10/2009 Hecht ...................... B23B 27/04
407/103
(Continued)

FOREIGN PATENT DOCUMENTS

EP 2 629 914 B1 5/2017
JP 2013-540058 A 10/2013
(Continued)

*Primary Examiner* — Sara Addisu
(74) *Attorney, Agent, or Firm* — Studebaker Brackett PLLC

(57) ABSTRACT

To provide a cutting insert such that a tool body can sufficiently hold the cutting insert even if one of cutting parts is broken. The cutting insert includes two side surfaces opposed to each other, a fixing hole passing through the centers of the two side surfaces, and an outer circumferential surface that is disposed between the outer circumferential edges of the two side surfaces and are connected to the outer circumferential edges of the two side surfaces. The outer circumferential surface includes four cutting parts, a first outer circumferential surface part that is disposed between the first cutting part and the second cutting part, and a second outer circumferential surface part that is opposed to the first outer circumferential surface part and is disposed between the third cutting part and the fourth cutting part. In a side view of the side surfaces from the axial direction of the fixing hole, the first outer circumferential surface part and the second outer circumferential surface part each have the center recessed toward the fixing hole, and a virtual arc having the same diameter as the diameter of the circumcircle of the cutting insert is in contact with two points on each of the outer circumferential surface parts.

15 Claims, 12 Drawing Sheets

(58) Field of Classification Search
CPC .......... B23B 2200/048; B23B 2200/16; B23B 2200/161; B23B 2200/3618; B23B 2200/369; B23B 2205/045; B23B 27/005; B23B 27/007; B23B 27/1611; B23B 27/1614; B23B 27/1622; B23B 27/1625; B23B 27/141; B23B 27/04
See application file for complete search history.

(56) References Cited

U.S. PATENT DOCUMENTS

| | | | | |
|---|---|---|---|---|
| 8,678,718 B2* | 3/2014 | Hecht | ................ | B23B 27/1614 |
| | | | | 407/104 |
| 9,174,279 B2* | 11/2015 | Hecht | ................ | B23B 27/045 |
| 9,457,409 B2* | 10/2016 | Zeeb | ................ | B23B 27/04 |
| 10,076,794 B2* | 9/2018 | Koifman | ................ | B23C 5/202 |
| 10,406,605 B2* | 9/2019 | Hecht | ................ | B23B 27/164 |
| 10,758,986 B2* | 9/2020 | Vöge | ................ | B23B 27/145 |
| 2012/0099935 A1 | 4/2012 | Hecht | | |
| 2013/0266384 A1* | 10/2013 | Hecht | ................ | B23B 27/04 |
| | | | | 407/103 |
| 2015/0290717 A1 | 10/2015 | Hecht | | |
| 2019/0091772 A1 | 3/2019 | Sagara | | |

FOREIGN PATENT DOCUMENTS

JP             2017-510469 A      4/2017
WOWO-201410683607201 A1 *   7/2014  ........... B23B 27/005

\* cited by examiner

Fig. 3
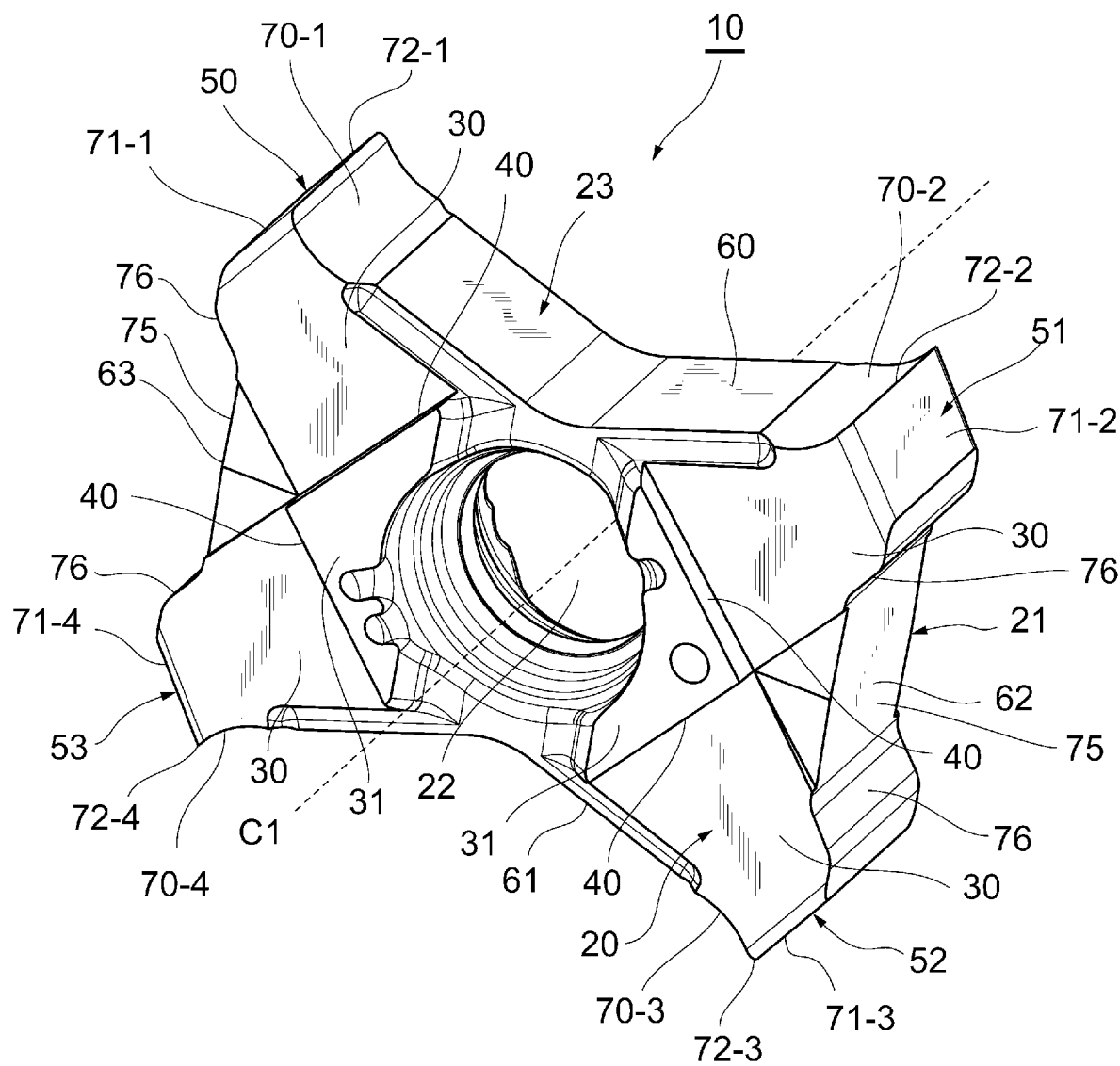
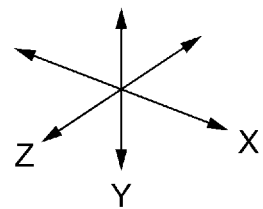

Fig. 4
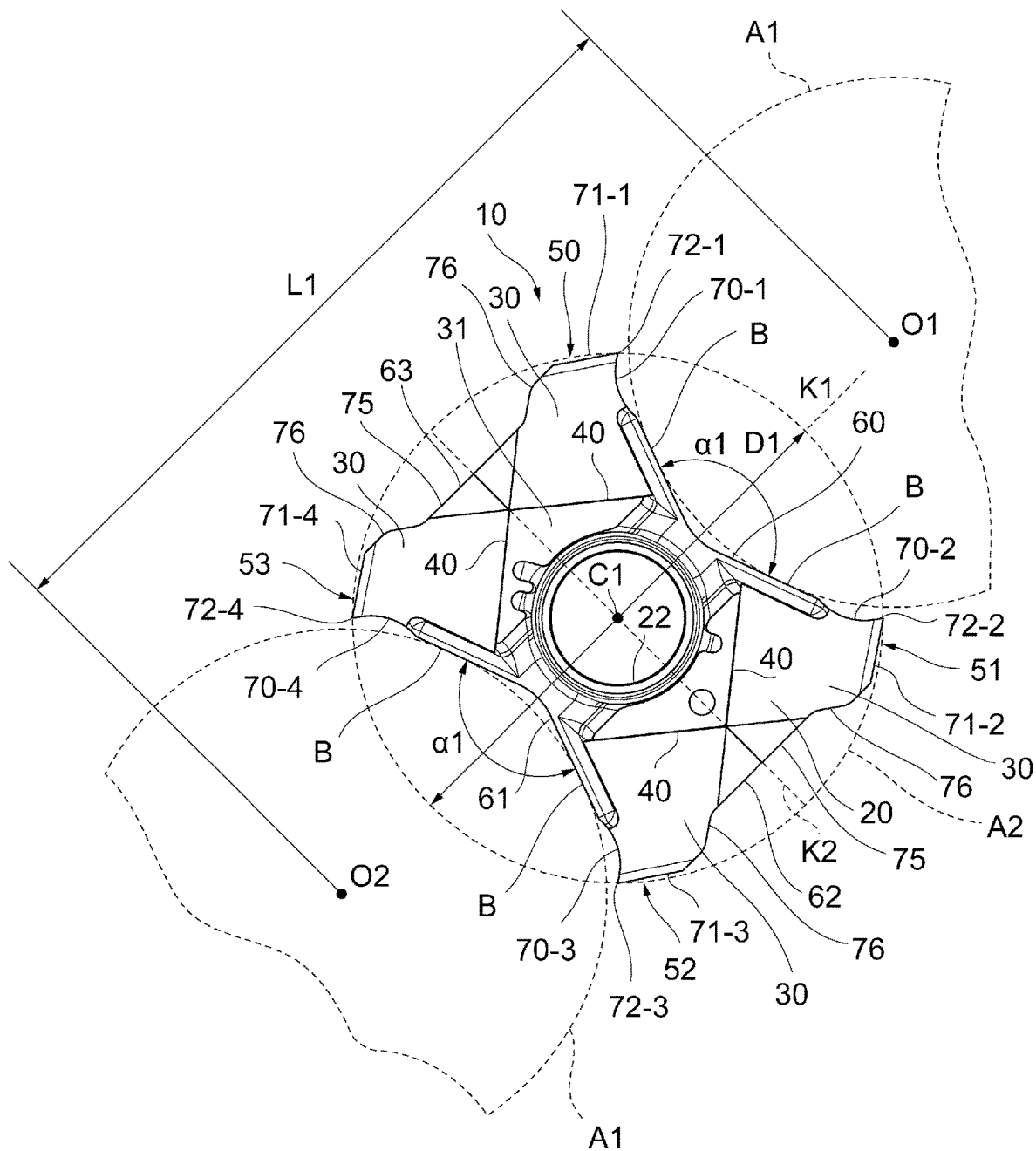
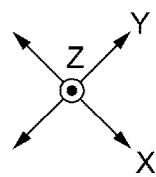

Fig. 5
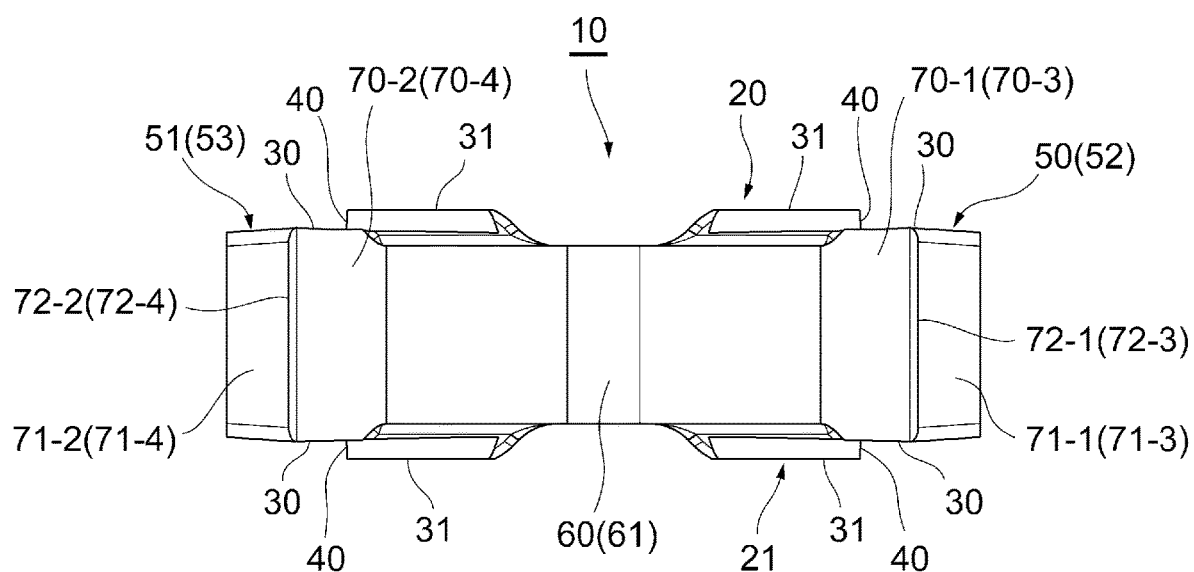
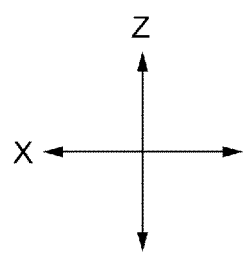

Fig. 8
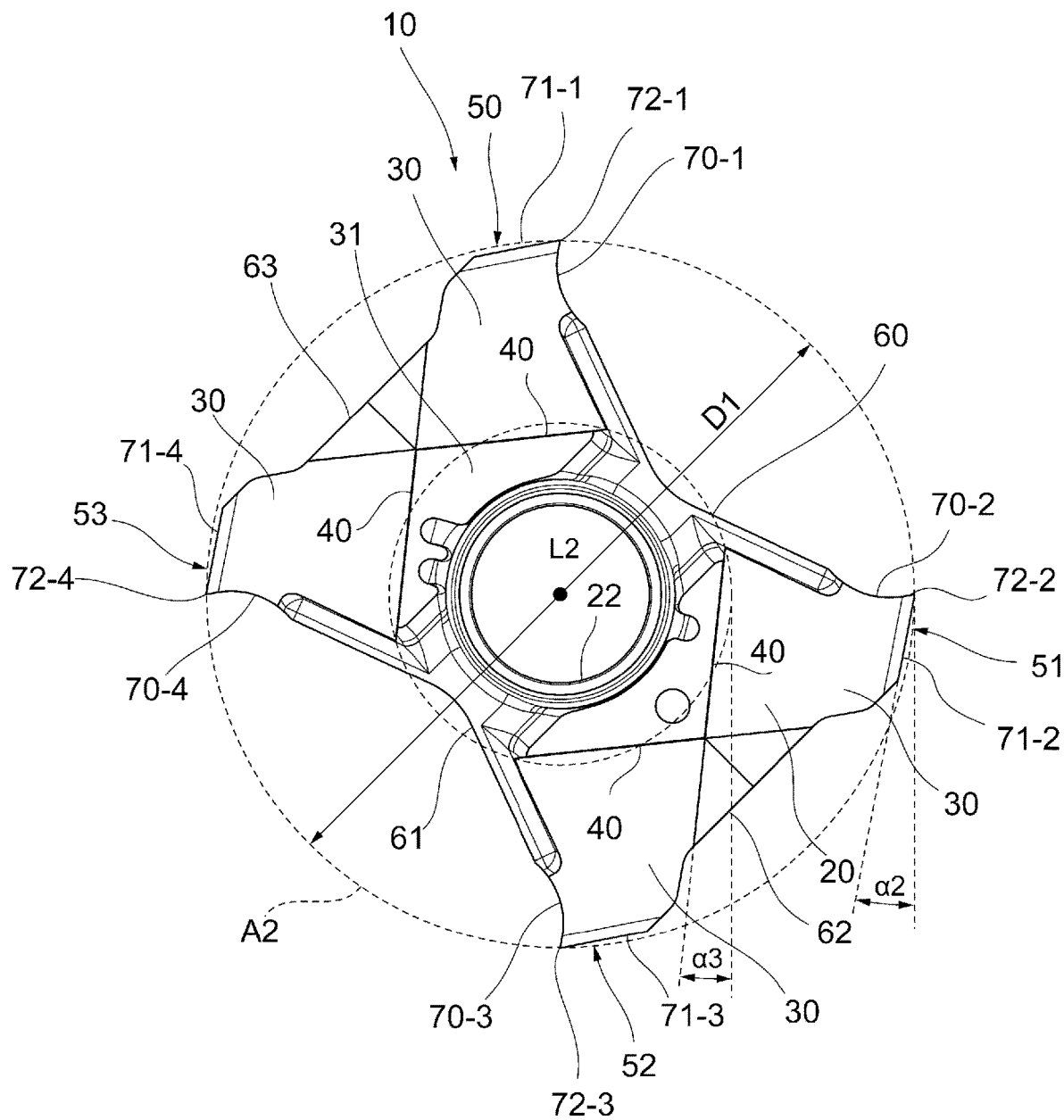
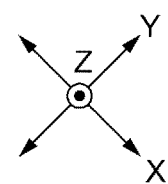

CUTTING INSERT AND CUTTING TOOL

BACKGROUND

Field

The present invention relates to a cutting insert and a cutting tool.

Description of Related Art

In a cutting tool for turning a work material and grooving the inner surface of the work material, a tool body typically holds a cutting insert at the distal end of the cutting tool. As such a cutting tool, Japanese Translation of PCT Application No. 2017-510469 discloses a cutting insert having four cutting parts with wavy irregularities formed on outer circumferential surfaces forming the four cutting parts. Such a cutting insert is advantageous in that the four cutting parts are usable.

SUMMARY

In the cutting tool, however, the tool body in contact with the cutting parts of the cutting insert holds the cutting insert. Thus, if one of the cutting parts is broken, the tool body may fail to sufficiently hold the cutting insert, so that the cutting insert may become unusable before all the cutting parts are used.

The present invention has been devised in view of the problem. An object of the present invention is to provide a cutting insert and a cutting tool such that a tool body can sufficiently hold the cutting insert even if one of cutting parts is broken.

A cutting insert according to an aspect of the present invention includes two side surfaces opposed to each other, a fixing hole passing through a center of each of the two side surfaces, and an outer circumferential surface that is disposed between the outer edges of the two side surfaces and are connected to the outer circumferential edges of the two side surfaces, the outer circumferential surface including: four cutting parts; a first outer circumferential surface part disposed between the first cutting part and the second cutting part of the four cutting parts, the first and second cutting parts being adjacent to each other; and a second outer circumferential surface part that is opposed to the first outer circumferential surface part and is disposed between the third cutting part and the fourth cutting part of the four cutting parts, the third and fourth cutting parts being adjacent to each other, wherein, in a side surface view in which the side surface is viewed from the axial direction of the fixing hole, the first outer circumferential surface part and the second outer circumferential surface part each have the center recessed toward the fixing hole, and a virtual arc having the same diameter as a diameter of the circumcircle of the cutting insert is in contact with two points on each of the outer circumferential surface parts.

According to the aspect, the tool body can come into contact with contact portions other than the cutting parts of the cutting insert and hold the cutting insert, so that the tool body can sufficiently hold the cutting insert even if one of the cutting parts is broken.

In the aspect, the first outer circumferential surface part and the second outer circumferential surface part may be substantially V-shaped in the side view of the side surfaces from the axial direction of the fixing hole.

In the aspect, the first outer circumferential surface part and the second outer circumferential surface part may have an angle of aperture of 130 degrees or larger and 179 degrees or smaller.

In the aspect, when two virtual arcs having the same diameter as the diameter of the circumcircle of the cutting insert are disposed in contact with the first outer circumferential surface part and the second outer circumferential surface part, respectively, a distance between the centers of the two virtual arcs may be 150% or less of the diameter of the circumcircle of the cutting insert.

In the aspect, the fixing hole may have a hole diameter that is 30% or less of the diameter of the circumcircle of the cutting insert.

In the aspect, the cutting insert may have a length that is 70% or less of the diameter of the circumcircle of the cutting insert in a direction connecting the lip of the first cutting part and the lip of the fourth cutting part, and the cutting insert may have a length that is 95% or less of the diameter of the circumcircle of the cutting insert in a direction connecting the lip of the first cutting part and the lip of the second cutting part.

In the aspect, the cutting part may have a clearance angle of 10 degrees or greater.

In the aspect, the side may have first parts including side surfaces of the four cutting parts and second parts that are located near the fixing hole on the first parts so as to protrude higher than the first parts, and the second part may have an outer face forming a second flank, the second flank having a clearance angle of 5 degrees or greater.

A cutting tool according to an aspect of the present invention includes the cutting insert and a tool body to which the cutting insert is to be fixed.

In the aspect, the tool body may include a first holding part that comes into contact with two points on one of the first outer circumferential surface part and the second outer circumferential surface part, and a second holding part that comes into contact with a point on the other of the first outer circumferential surface part and the second outer circumferential surface part.

In the aspect, the first holding part may have an arc face protruding toward the second holding part.

In the aspect, the second holding part may have an arc face protruding toward the first holding part.

In the aspect, the tool body may have a screw hole, the cutting insert may be fixed to the tool body with a screw inserted into the fixing hole and the screw hole, and in a plan view of the distal end of the cutting tool from the axial direction of the tool body, the center of the screw hole of the tool body may be shifted from the center of the fixing hole of the cutting insert, the cutting insert may be fixable to the tool body with the screw, and the center of the screw hole of the tool body may be shifted from the center of the fixing hole of the cutting insert in a direction tilted at 0 degree with respect to a vertically downward direction or at an angle of 45 degrees or less toward the center of the tool body in a state in which the lip of the cutting part used for the cutting insert and the center of the fixing hole are disposed on a horizontal line.

In the aspect, in a plan view of the distal end of the cutting tool from the axial direction of the tool body, the cutting insert may be fixable to the tool body such that a virtual straight line connecting the lips of two of the four cutting parts is a horizontal line, the two cutting parts being diagonally opposite to each other.

BRIEF DESCRIPTION OF DRAWINGS

FIG. 3 is a perspective view of a cutting insert;

FIG. 4 is a side view illustrating the cutting insert from the axial direction of the fixing hole;

FIG. 5 is a front view of a first outer circumferential surface part or a second surface outer part on the cutting insert;

FIG. 8 is a side view illustrating the cutting insert from the axial direction of the fixing hole to describe angles α2 and α3;

DETAILED DESCRIPTION

A preferred embodiment of the present invention will be described below with reference to the accompanying drawings.

Figure 1:
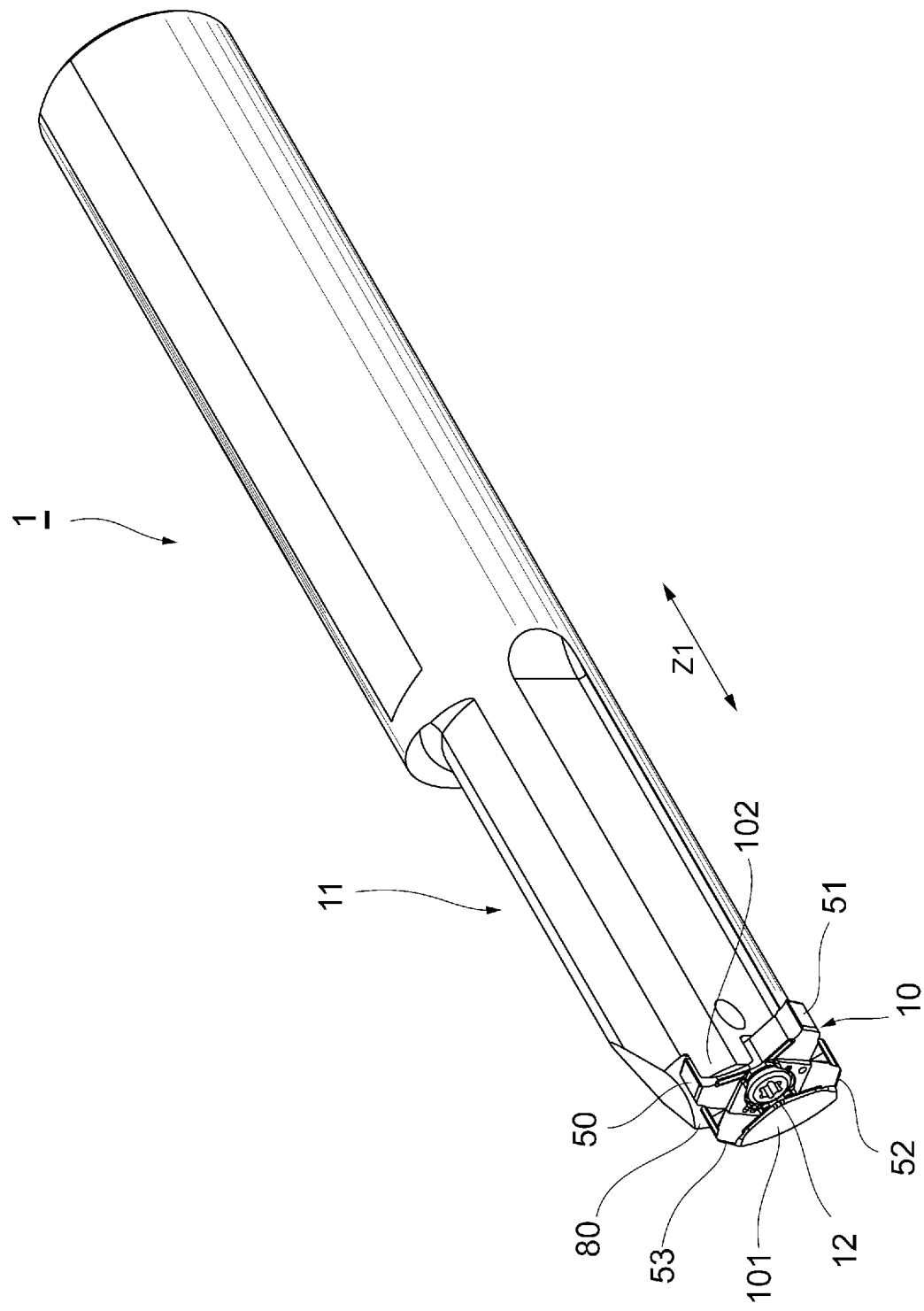
FIG. 1 is a perspective view illustrating an example of a cutting tool according to the present embodiment.
Figure 2:
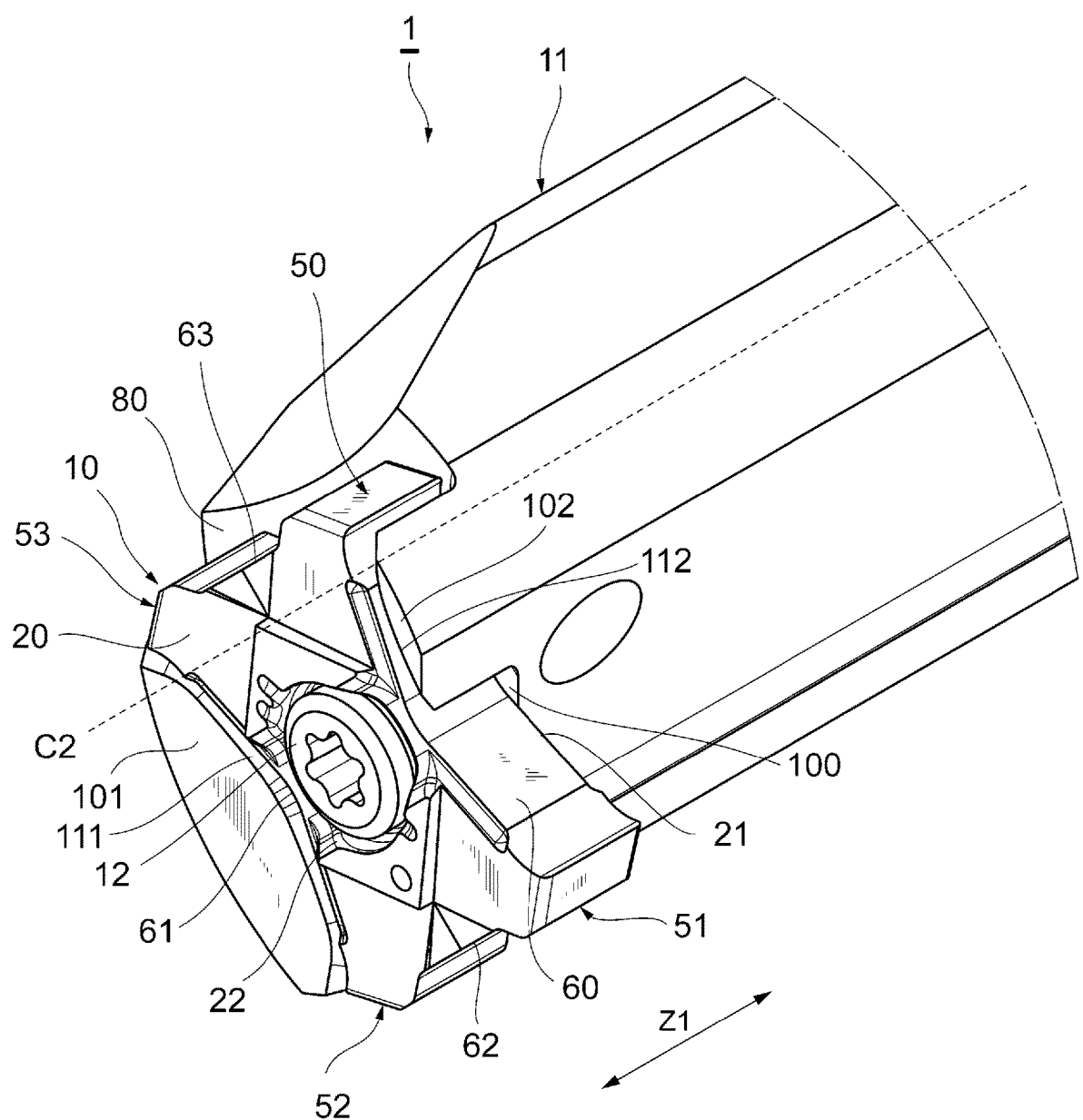
FIG. 2 is an enlarged view of the distal end part of the cutting tool.

FIG. 1 is a perspective view illustrating an example of a cutting tool 1 according to the present embodiment. FIG. 2 is an enlarged view of the distal end part of the cutting tool 1. The cutting tool 1 is, for example, a tuning tool with a replaceable cutting edge. The cutting tool 1 includes a cutting insert 10 and a tool body (holder) 11 to which the cutting insert 10 is fixed. The cutting insert 10 is fixed to the tool body 11 with a screw 12.

Cutting Insert

Figure 6:
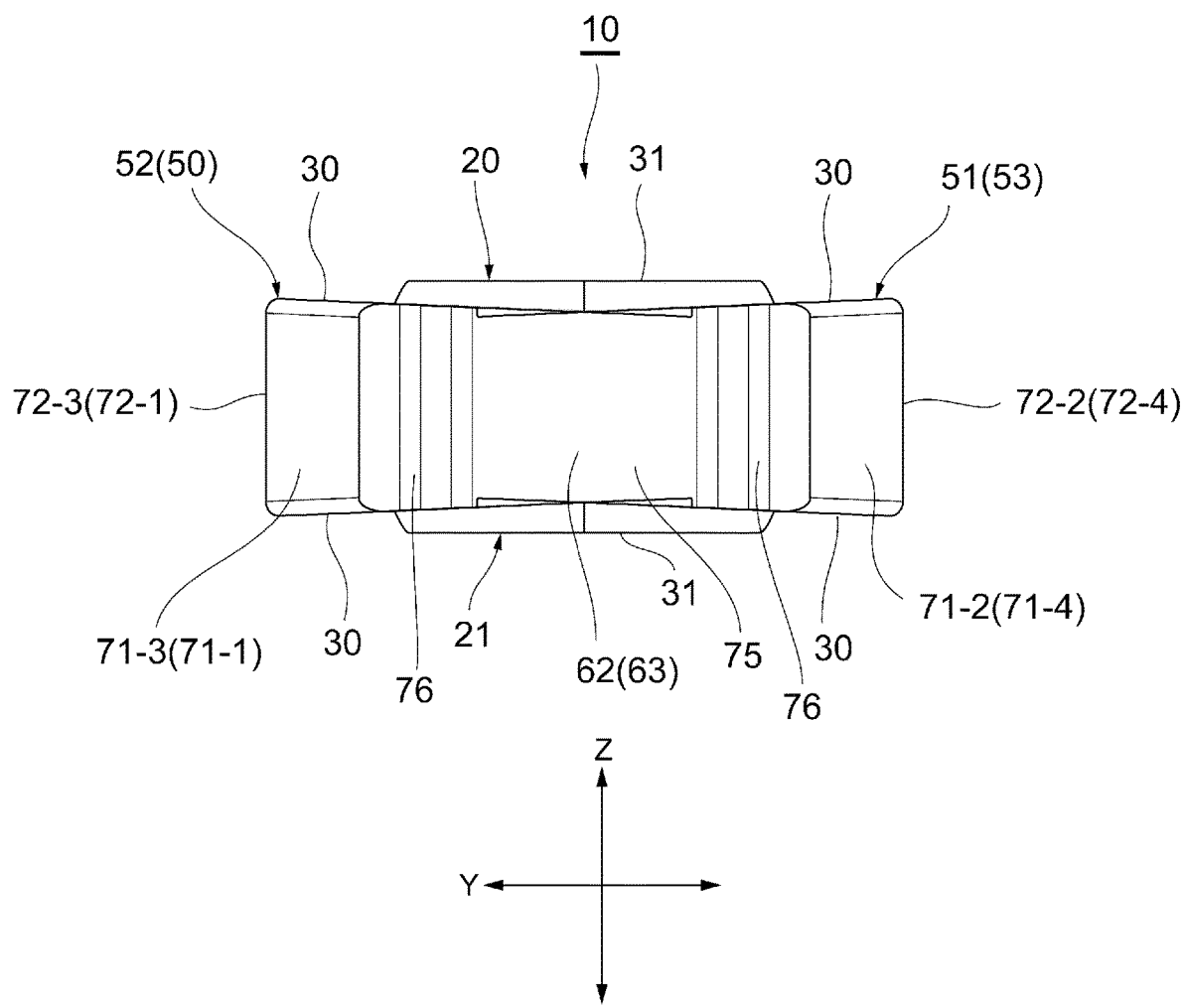
FIG. 6 is a front view of a third outer circumferential surface part or a fourth outer circumferential surface part on the cutting insert.

FIG. 3 is a perspective view of the cutting insert 10. FIG. 4 is a side view illustrating the cutting insert 10 from the axial direction of the fixing hole. FIG. 5 is a front view of a first outer circumferential surface part or a second surface outer part on the cutting insert 10. FIG. 6 is a front view of a third outer circumferential surface part or a fourth outer circumferential surface part on the cutting insert 10.

As illustrated in FIG. 3, the cutting insert 10 is a thick and substantially rectangular body. The cutting insert 10 includes two side surfaces 20 and 21 opposed to each other, a fixing hole 22 passing through the centers of the two side surfaces 20 and 21, and an outer circumferential surface 23 that is disposed between the outer circumferential edges of the two side surfaces 20 and 21 and are connected to the outer circumferential edges of the two side surfaces 20 and 21.

The side 20 is substantially rectangular, and the circular fixing hole 22 is formed at the center of the side 20. At the four corners of the side 20, cutting parts 50 to 53 are located, which will be described later.

The side 20 has first parts 30 that are located near the four corners and second parts 31 that are located near the fixing hole 22 on the first parts 30 so as to surround the fixing hole 22 and protrude higher than the first parts 30. The second part 31 is substantially diamond-shaped and has four outer faces 40 on the outer circumferential edges. The outer faces 40 are vertical surfaces raised substantially perpendicularly (in an axial direction Z of the fixing hole 22) to the second parts 31. Moreover, the outer faces 40 are directed toward the cutting parts 50 to 53, which will be described later, in a direction orthogonal to the axial direction Z of the fixing hole 22. The surfaces of the second parts 31 are, for example, flat surfaces orthogonal to the axial direction Z of the fixing hole 22 and come into contact with a fixing bottom 100 of the tool body 11, which will be described later, when the cutting insert 10 is attached to the tool body 11.

The side 21, the back side of the side 20, has the same configuration as the side 20. Specifically, like the side 20, the side 21 has first parts 30 and second parts 31 with four outer faces 40.

The outer circumferential surface 23 has the four cutting parts 50, 51, 52, and 53 and four outer circumferential surface parts 60, 61, 62, and 63. As illustrated in FIG. 4, the outer circumferential surface 23 is shaped with line symmetry with respect to a center line K1 extended along a width direction Y passing through the center of the cutting insert 10 (a center C1 of the fixing hole 22) in a longitudinal direction X and a center line K2 extended along the longitudinal direction X passing through the center of the cutting insert 10 in the width direction Y (the center C1 of the fixing hole 22).

As illustrated in FIGS. 3 and 4, the outer circumferential surface 23 includes the first cutting part 50, the second cutting part 51, the third cutting part 52, and the fourth cutting part 53 in this order around a center C1 of the fixing hole 22 (clockwise in FIGS. 3 and 4). The first cutting part 50 and the second cutting part 51 are adjacent to each other and the third cutting part 52 and the fourth cutting part 53 are adjacent to each other in the longitudinal direction X; meanwhile, the second cutting part 51 and the third cutting part 52 are adjacent to each other and the first cutting part 50 and the fourth cutting part 53 are adjacent to each other in the width direction Y.

The first cutting part 50 has a cutting face 70-1, a flank 71-1 forming a crossing edge line with the cutting face 70-1, and a lip 72-1 formed on the crossing edge line between the cutting face 70-1 and the flank 71-1. The side surfaces of the first cutting part 50 forming crossing edge lines with the cutting face 70-1 and the flank 71-1 are the first parts 30 of the side surfaces 20 and 21.

The second cutting part 51 has a cutting face 70-2, a flank 71-2, and a lip 72-2 like the first cutting part 50. The lip 72-1 of the first cutting part 50 and the lip 72-2 of the second cutting part 51 are opposed to each other. Specifically, the cutting face 70-1 of the first cutting part 50 and the cutting face 70-2 of the second cutting part 51 are directed in the same direction (substantially in the width direction Y) while the flank 71-1 of the first cutting part 50 and the flank 71-2 of the second cutting part 51 are directed in opposite directions (substantially in the longitudinal direction X).

The third cutting part 52 has a cutting face 70-3, a flank 71-3, and a lip 72-3 like the first cutting part 50. The fourth cutting part 53 has a cutting face 70-4, a flank 71-4, and a lip 72-4 like the first cutting part 50. The lip 72-3 of the third cutting part 52 and the lip 72-4 of the fourth cutting part 53 are opposed to each other. Specifically, the cutting face 70-3 of the third cutting part 52 and the cutting face 70-4 of the fourth cutting part 53 are directed in the same direction (substantially in the width direction Y) while the flank 71-3 of the third cutting part 52 and the flank 71-4 of the fourth cutting part 53 are directed in opposite directions (substantially in the longitudinal direction X).

As illustrated in FIGS. 3 to 5, the first outer circumferential surface part 60 is disposed between the first cutting part 50 and the second cutting part 51 adjacent to each other in the longitudinal direction X, and the second outer circumferential surface part 61 is opposed to the first outer circumferential surface part 60 and is disposed between the third cutting part 52 and the fourth cutting part 53 adjacent to each other in the longitudinal direction X. As illustrated in FIGS. 3, 4, and 6, the third outer circumferential surface part 62 is disposed between the second cutting part 51 and the third cutting part 52 adjacent to each other in the width direction Y, and the fourth outer circumferential surface part 63 is opposed to the third outer circumferential surface part 62 and is disposed between the first cutting part 50 and the fourth cutting part 53 adjacent to each other in the width direction Y.

As illustrated in FIGS. 3 to 5, the first outer circumferential surface part 60 is formed between the cutting face 70-1 of the first cutting part 50 and the cutting face 70-2 of the second cutting part 51. The first outer circumferential surface part 60 has the center recessed near the fixing hole 22 in the longitudinal direction X as illustrated in FIGS. 3 and 4. For example, as illustrated in FIG. 4, the first outer circumferential surface part 60 is substantially V-shaped in a side view of the side 20 viewed from the axial direction Z of the fixing hole 22. The first outer circumferential surface part 60 is configured such that a virtual arc A1 in contact with the first outer circumferential surface part 60 has two contact portions B.

As illustrated in FIGS. 3 to 5, the second outer circumferential surface part 61 is formed between the cutting face 70-3 of the third cutting part 52 and the cutting face 70-4 of the fourth cutting part 53. Like the first outer circumferential surface part 60, the second outer circumferential surface part 61 has the center recessed near the fixing hole 22 in the longitudinal direction X and is substantially V-shaped as illustrated in FIGS. 3 and 4. The second outer circumferential surface part 61 is configured such that a virtual arc A1 in contact with the second outer circumferential surface part 61 has two contact portions B as illustrated in FIG. 4. The virtual arc A1 has the same diameter as a diameter D1 of a circumcircle (a circle passing through the lips of the cutting parts 50 to 53) A2 of the cutting insert 10. The virtual arcs A1 are located in contact with the recessed faces of the first outer circumferential surface part 60 and the second outer circumferential surface part 61. The contact portion B is located between the center and each outer end of the first outer circumferential surface part 60 and the second outer circumferential surface part 61.

The first outer circumferential surface part 60 and the second outer circumferential surface part 61 have an angle of aperture α1 of 130 degrees or greater and 179 degrees or smaller. The angle of aperture α1 is preferably set at 140 degrees or more and 150 degrees or less.

When the virtual arc A1 has the same diameter as the diameter D1 of the circumcircle (the circle passing through the lips of the cutting parts 50 to 53) A2 of the cutting insert 10 and the two virtual arcs A1 are disposed in contact with the first outer circumferential surface part 60 and the second outer circumferential surface part 61, a distance L1 between centers O1 and O2 of the two virtual arcs A1 is 150% or less of the diameter D1 of the circumcircle A2 of the cutting insert 10. The distance L1 is preferably 140% or more and 150% or less of the diameter D1 of the circumcircle A2 and is more preferably 143% or more and 147% or less.

As illustrated in FIGS. 3, 4, and 6, the third outer circumferential surface part 62 is formed between the flank 71-2 of the second cutting part 51 and the flank 71-3 of the third cutting part 52. For example, the third outer circumferential surface part 62 has a central flat face 75 in the width direction Y and tilted faces 76 connected to the flanks 71-2 and 71-3 from both ends of the flat face 75. The fourth outer circumferential surface part 63 is formed between the flank 71-1 of the first cutting part 50 and the flank 71-4 of the fourth cutting part 53. For example, the fourth outer circumferential surface part 63 has a central flat face 75 in the width direction Y and tilted faces 76 connected to the flanks 71-1 and 71-4 from both ends of the flat face 75.

Figure 7:
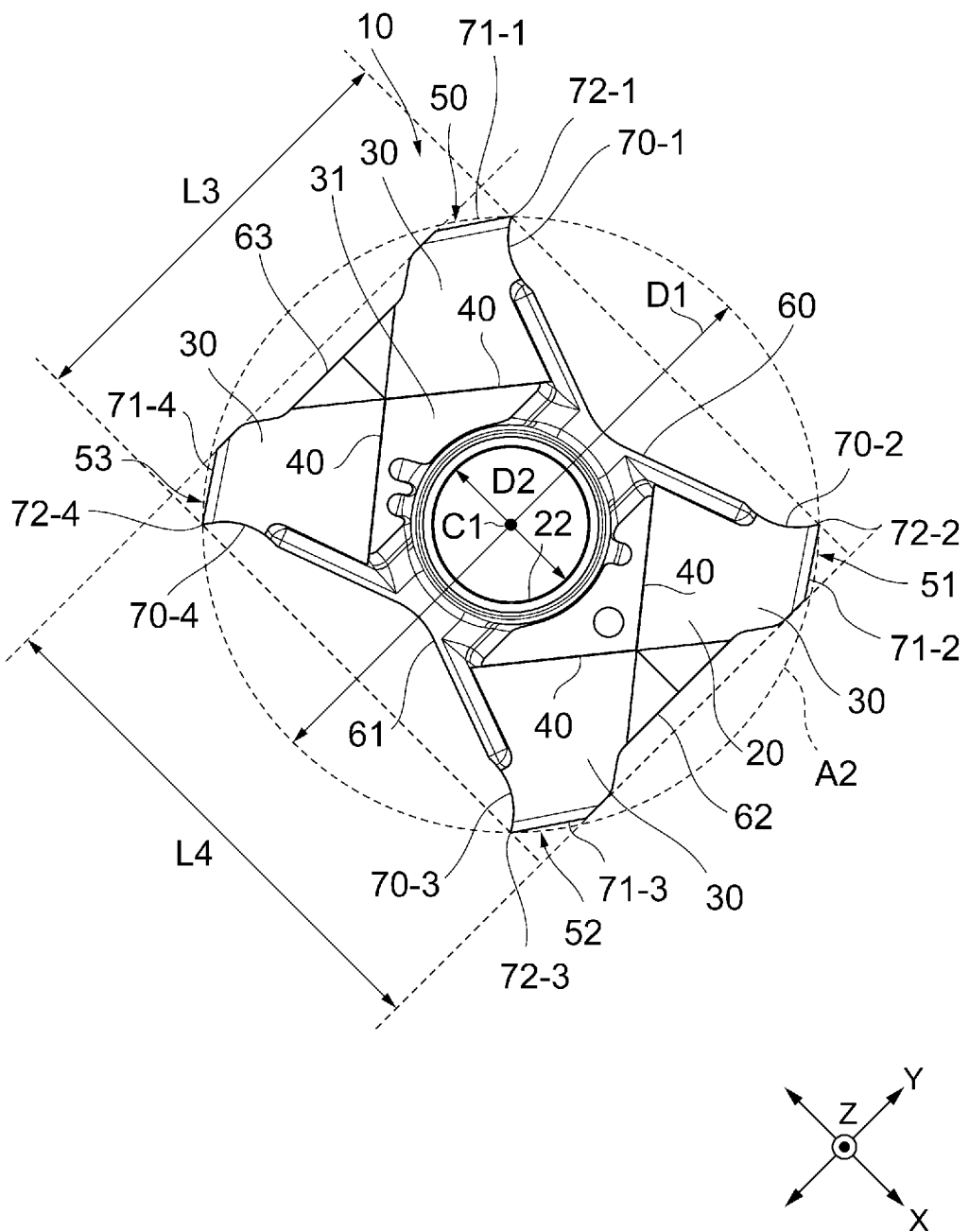
FIG. 7 is a side view illustrating the cutting insert from the axial direction of the fixing hole to describe distances L3 and L4.

As illustrated in FIG. 7, a length L3 of the cutting insert 10 in a direction (width direction Y) connecting the lip 72-1 of the first cutting part 50 and the lip 72-4 of the fourth cutting part 53 is 70% or more and 75% or less of a length L4 of the cutting insert 10 in a direction (longitudinal direction X) connecting the lip 72-1 of the first cutting part 50 and the lip 72-2 of the second cutting part 51. The length L3 is also a distance between the lip 72-1 of the first cutting part 50 and the lip 72-4 of the fourth cutting part 53.

Moreover, the length L4 of the cutting insert 10 in the longitudinal direction X is 95% or less, preferably 85% or more and 95% or less of the diameter D1 of the circumcircle A2 of the cutting insert 10. The length L3 of the cutting insert 10 in the width direction Y is 70% or less, preferably 65% or more and 70% or less of the diameter D1 of the circumcircle A2 of the cutting insert 10.

A hole diameter D2 of the fixing hole 22 is 30% or less of the diameter D1 of the circumcircle A2 of the cutting insert 10. The hole diameter D2 is preferably 20% or more and 28% or less of the diameter D1 of the circumcircle A2.

As illustrated in FIG. 8, the flanks 71-1, 71-2, 71-3, and 71-4 of the cutting parts 50 to 53 have a clearance angle α2 of 10 degrees or greater, preferably 10 degrees or greater and 15 degrees or smaller.

When the lips of the cutting parts 50 to 53 cut into a work material, the outer faces 40 of the second parts 31 on the side surfaces 20 and 21 may come into contact with the work material. Thus, the outer face 40 has a second flank. The second flank of the outer face 40 has a clearance angle α3 of 5 degrees or greater. The clearance angle α3 of the second flank is preferably 5 degrees or greater and 10 degrees or smaller.

Tool Body

As illustrated in FIG. 1, the tool body 11 is substantially shaped like a long cylinder extending in one direction. The distal end part of the tool body 11 has a fixing part 80 to which the cutting insert 10 is fixed.

Figure 9:
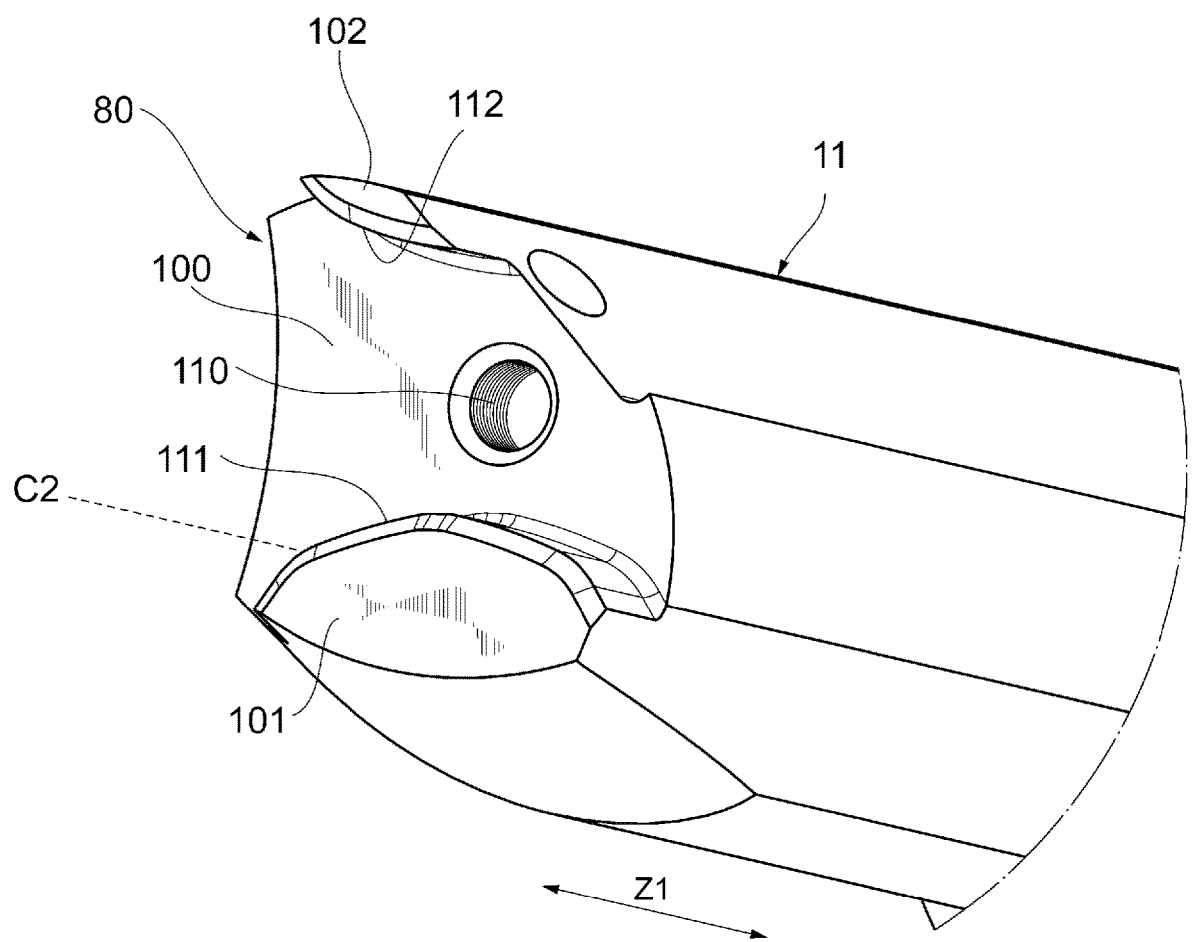
FIG. 9 is a perspective view illustrating the fixing part of a tool body.
Figure 10:
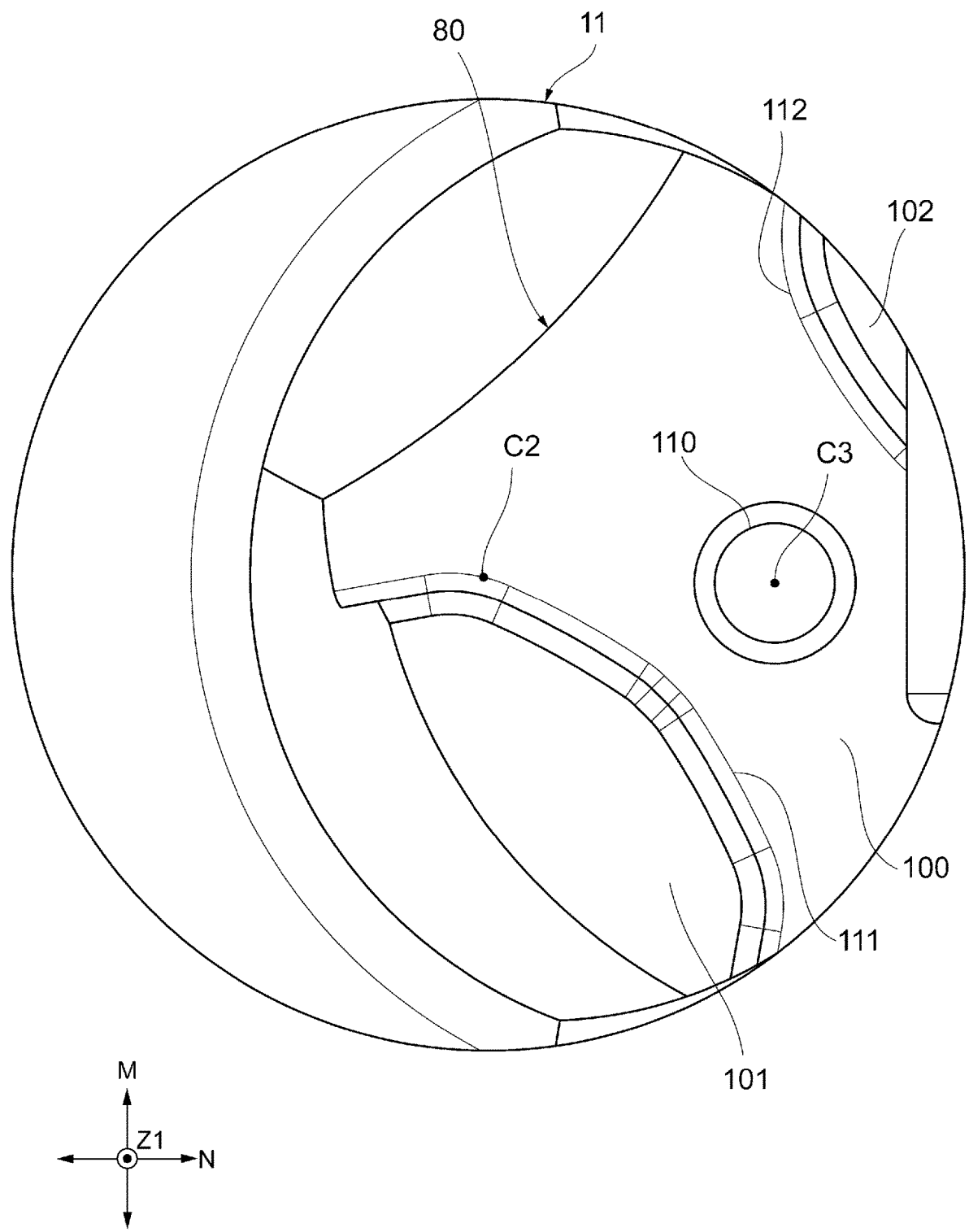
FIG. 10 is a front view of the tool body.

FIG. 9 is a perspective view illustrating the fixing part 80 of the tool body 11 from which the cutting insert 10 has been removed. FIG. 10 is a front view illustrating the fixing part 80 of the tool body 11 from which the cutting insert 10 has been removed, the fixing part 80 being viewed from an axial direction Z1. The tool body 11 is fixed to a cutter in a position illustrated in FIG. 10 when being used. The vertical and horizontal directions in the present specification are set based on the position of the tool body 11 illustrated in FIG. 10.

As illustrated in FIGS. 9 and 10, the fixing part 80 of the tool body 11 includes the fixing bottom 100 that is brought into contact with, for example, the side 20 or the side 21 of the cutting insert 10 and a first holding part 101 and a second holding part 102 that hold the outer circumferential surface 23 of the cutting insert 10.

The fixing bottom 100 is, for example, a flat surface orthogonal to the axial direction Z1 (the direction of a central axis C2) of the tool body 11. On the fixing bottom 100, a screw hole 110 formed for screwing the screw 12 is extended in the axial direction Z1. As illustrated in FIG. 10, in a front view of the tool body 11 from the axial direction Z1, the screw hole 110 has a center C3 that is positioned like the central axis C2 of the tool body 11 (for example, shifted slightly downward) in a vertical direction M and is shifted to the right from the center C2 in a horizontal direction N.

As illustrated in FIGS. 9 and 10, the first holding part 101 and the second holding part 102 protrude from the fixing bottom 100 toward the distal end. As illustrated in FIG. 10, the first holding part 101 is disposed on the lower side of the fixing bottom 100. The first holding part 101 has an arc face 111 near the fixing bottom 100 disposed on the upper side of the first holding part 101, the arc face 111 being raised substantially perpendicularly to the fixing bottom 100. The arc face 111 curves diagonally to the upper right into a convex shape near the fixing bottom 100. The arc face 111 has a longer curving surface than the first outer circumferential surface part 60 or the second outer circumferential surface part 61 of the cutting insert 10.

The second holding part 102 is disposed at the upper side of the fixing bottom 100. The second holding part 102 has an arc face 112 near the fixing bottom 100 disposed on the lower side of the second holding part 102, the arc face 112 being raised substantially perpendicularly to the fixing bottom 100. The arc face 112 curves diagonally to the lower left into a convex shape near the fixing bottom 100. The arc face 112 has a curving surface that is shorter than the arc face 111 of the first holding part 101 and measures about a half length of the first outer circumferential surface part 60 or the second outer circumferential surface part 61 of the cutting insert 10.

Cutting Tool

Figure 11:
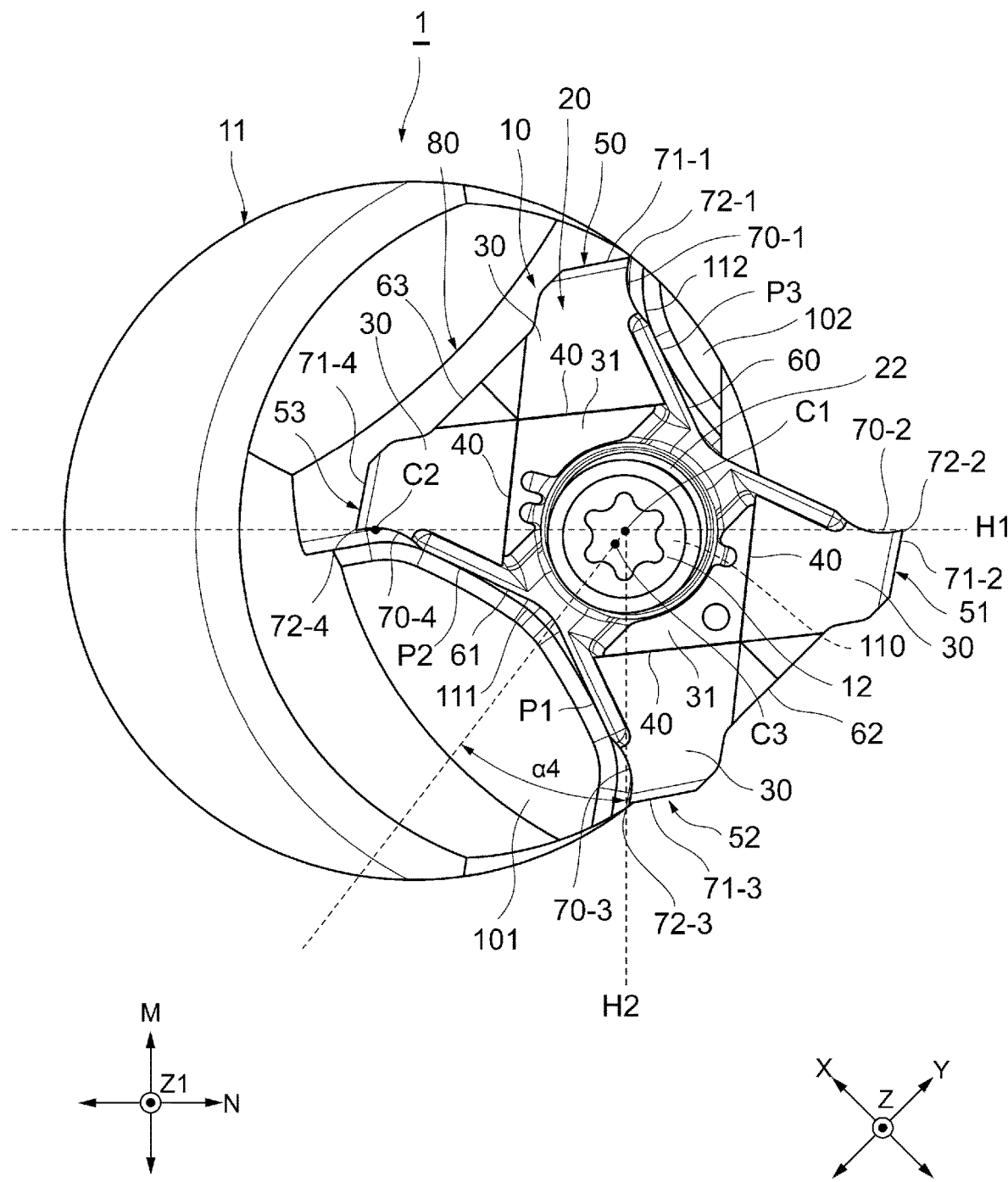
FIG. 11 is a front view of the cutting tool with the cutting insert attached to the tool body.

FIG. 11 is a front view of the cutting tool 1 with the cutting insert 10 attached to the tool body 11.

As illustrated in FIGS. 2 and 11, the cutting insert 10 is fixed to the tool body 11 with the screw 12 inserted into the fixing hole 22 and the screw hole 110. In this example, the second cutting part 51 is used for cutting from among the four cutting parts 50 to 53.

For example, the side 21 of the cutting insert 10 is in contact with the fixing bottom 100 of the tool body 11, and the side 20 is exposed to the front. As illustrated in FIG. 11, the second outer circumferential surface part 61 of the cutting insert 10 is in contact with the arc face 111 of the first holding part 101 at two points. At this point, the contact portions of the second outer circumferential surface part 61 are a portion P1 between the third cutting part 52 and the center of the second outer circumferential surface part 61 in the longitudinal direction X and a portion P2 between the fourth cutting part 53 and the center of the second outer circumferential surface part 61 in the longitudinal direction X. A portion around the center of the second outer circumferential surface part 61 in the longitudinal direction X, the cutting face 70-3 of the third cutting part 52, and the cutting face 70-4 of the fourth cutting part 53 are not in contact with the arc face 111.

The first outer circumferential surface part 60 of the cutting insert 10 is in contact with the arc face 112 of the second holding part 102 at a point. At this point, the contact portion of the first outer circumferential surface part 60 is a portion P3 between the first cutting part 50 and the center of the first outer circumferential surface part 60 in the longitudinal direction X. The cutting face 70-1 of the first cutting part 50, a portion around the center of the first outer circumferential surface part 60 in the longitudinal direction X, a portion between the second cutting part 51 and the portion around the center of the first outer circumferential surface part 60, and the cutting face 70-2 of the second cutting part 51 are not in contact with the arc face 112.

As illustrated in FIG. 11, in the front view of the distal end of the cutting tool 1 from the axial direction Z1 of the tool body 11, the screw hole 110 of the tool body 11 has the center C3 slightly shifted from the center C1 of the fixing hole 22 of the cutting insert 10. In other words, the screw 12 is slightly smaller in diameter than the fixing hole 22 and is inserted into the screw hole 110 while being shifted from the center C1 in the fixing hole 22. In a state in which the lip 72-2 of the second cutting part 51 of the cutting insert 10 and the center C1 of the fixing hole 22 are disposed on a horizontal line H1, the center C3 of the screw hole 110 of the tool body 11 is shifted from the center C1 of the fixing hole 22 of the cutting insert 10 in a direction tilted at 0 degrees with respect to a vertically downward direction H2 or at an angle α4 of 45 degrees or less toward the center C2 of the tool body 11. The angle α4 is preferably 40 degrees or greater and 44 degrees or smaller.

As illustrated in FIG. 11, in the front view of the distal end of the cutting tool 1 from the axial direction Z1 of the tool body 11, the cutting insert 10 is fixed such that a virtual straight line H1 connecting the lips 72-2 and 72-4 of the second cutting part 51 and the fourth cutting part 53, which are diagonally opposite to each other, is a horizontal line (a set angle of 0 degree) with respect to the tool body 11.

Figure 12:
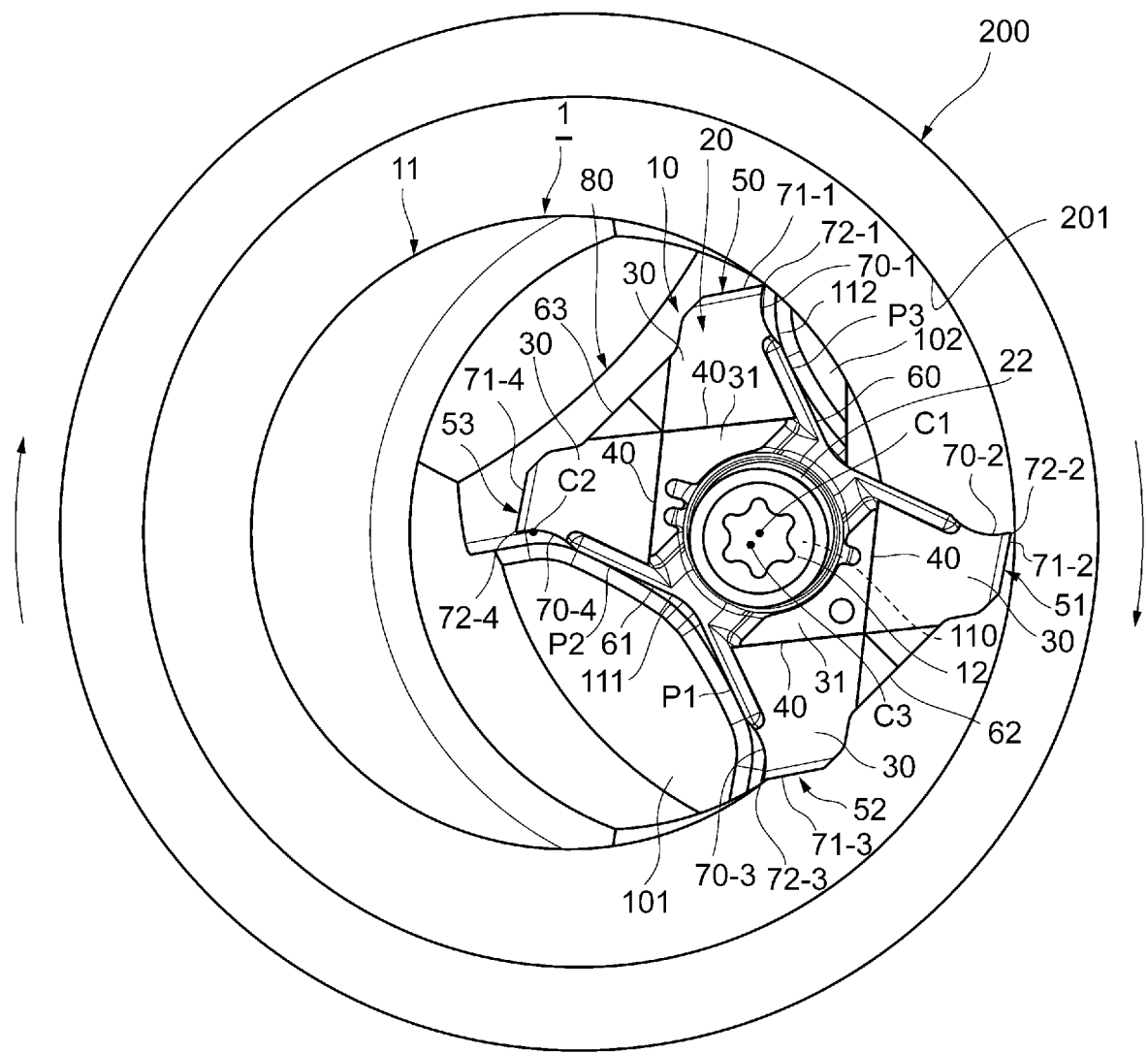
FIG. 12 is a front view of the cutting tool being used.

For example, the cutting tool 1 is used during grooving on the inner surface of a work material. At this point, the cutting tool 1 is viewed from the front as illustrated in FIG. 12. A work material 200 rotates clockwise about the rotation axis serving as the central axis, the second cutting part 51 of the cutting tool 1 moves forward to the right in the horizontal direction N with respect to an inner surface 201 of the work material 200, and the inner surface 201 of the work material 200 is grooved by the lip 72-2.

When a cutting part other than the second cutting part 51 of the cutting insert 10 is used during cutting, the cutting insert 10 of FIG. 11 is rotated 180° around the center C1 of the fixing hole 22 to be attached to the tool body 11, so that the fourth cutting part 53 can be used. At this point, the first outer circumferential surface part 60 is held at two points by the first holding part 101 while the second outer circumferential surface part 61 is held at a point by the second holding part 102. Moreover, the cutting insert 10 of FIG. 11 is flipped to have the side 21 at the front, the first outer circumferential surface part 60 is held by the first holding part 101, and the second outer circumferential surface part 61 is held by the second holding part 102, so that the third cutting part 52 can be used. Furthermore, the cutting insert 10 is rotated 180°, so that the first cutting part 50 can be used.

According to the present embodiment, the outer circumferential surface 23 of the cutting insert 10 has the four cutting parts 50 to 53, the first outer circumferential surface part 60, and the second outer circumferential surface part 61, the first outer circumferential surface part 60 and the second outer circumferential surface part 61 each have the center recessed toward the fixing hole 22, and the virtual arc A1 having the same diameter as the diameter D1 of the circumcircle A2 of the cutting insert 10 is in contact with two points on each of the outer circumferential surface parts 60 and 61. This allows the tool body 11 to come into contact with the contact portions B other than the cutting parts 50 to 53 of the cutting insert 10 and hold the cutting insert 10, so that the tool body 11 can sufficiently hold the cutting insert 10 even if one of the cutting parts is broken. The virtual arc A1 having the same diameter as the diameter D1 of the circumcircle A2 of the cutting insert 10 is in contact with two points on each of the first outer circumferential surface part 60 and the second outer circumferential surface part 61, thereby easily securing the thickness of the cutting insert 10 in the width direction Y and the thicknesses of the first holding part 101 and the second holding part 102 of the tool body 11. This can suppress the deformation and breakage of the cutting insert 10 and the tool body 11.

The first outer circumferential surface part 60 and the second outer circumferential surface part 61 are substantially V-shaped in a side view of the side surfaces 20 and 21 from the axial direction Z of the fixing hole 22. This allows the tool body 11 to properly come into contact with the contact portions B other than the cutting parts 50 to 53 of the cutting insert 10 and sufficiently hold the cutting insert 10.

The first outer circumferential surface part 60 and the second outer circumferential surface part 61 have an angle of aperture α1 of 130 degrees or larger and 179 degrees or smaller. This can easily secure the thickness of the cutting insert 10 in the width direction Y and the thicknesses of the first holding part 101 and the second holding part 102 of the tool body 11, thereby suppressing the deformation and breakage of the cutting insert 10 and the tool body 11.

When the two virtual arcs A1 having the same diameter as the diameter D1 of the circumcircle A2 of the cutting insert 10 are disposed in contact with the first outer circumferential surface part 60 and the second outer circumferential surface part 61, respectively, the distance L1 between the centers O1 and O2 of the two virtual arcs A1 is 150% or less of the diameter D1 of the circumcircle A2 of the cutting insert 10. Thus, the angle of aperture α1 for the first outer circumferential surface part 60 and the second outer circumferential surface part 61 increases. This can easily secure the thickness of the cutting insert 10 in the width direction Y and the thicknesses of the first holding part 101 and the second holding part 102 of the tool body 11, thereby suppressing the deformation and breakage of the cutting insert 10 and the tool body 11.

The hole diameter D2 of the fixing hole 22 is 30% or less of the diameter D1 of the circumcircle A2 of the cutting insert 10, thereby securing a thickness around the fixing hole 22 of the cutting insert 10 to obtain the strength of the cutting insert 10.

The length L3 of the cutting insert 10 in the direction (width direction Y) connecting the lip 71-1 of the first cutting part 50 and the lip 74-4 of the fourth cutting part 53 is 70% or less of the diameter D1 of the circumcircle A2 of the cutting insert 10. The length L4 of the cutting insert 10 in the direction (longitudinal direction X) connecting the lip 71-1 of the first cutting part 50 and the lip 71-2 of the second cutting part 51 is 95% or less of the diameter of the circumcircle of the cutting insert. This obtains a proper length between the lips of the cutting insert 10, thereby securing a sufficient surface in contact with the tool body 11.

The cutting parts 50 to 53 have the clearance angle α2 of 10 degrees or greater, enabling machining on a work material having a small diameter.

The second parts 31 of the side surfaces 20 and 21 have the outer faces 40 forming the second flank, and the clearance angle α3 of the second flank is 5 degrees or greater. In this case, the second flank of the outer face 40 has a sufficiently large clearance angle, thereby suppressing the contact of the outer face 40 with a work material when the cutting parts 50 to 53 more deeply perform grooving. This enables deeper grooving by the cutting parts 50 to 53.

In the cutting tool 1, the tool body 11 includes the first holding part 101 that comes into contact with two points on one of the first outer circumferential surface part 60 and the second outer circumferential surface part 61 and the second holding part 102 that comes into contact with a point on the other of the first outer circumferential surface part 60 and the second outer circumferential surface part 61. Thus, the tool body 11 properly holds the cutting insert 10 at three points other than the cutting parts 50 to 53; meanwhile, even if one of the cutting parts 50 to 53 is broken, the tool body 11 can sufficiently hold the cutting insert 10.

The first holding part 101 has the arc face 111 protruding toward the second holding part 102, and the second holding part 102 has the arc face 112 protruding toward the first holding part 101. Thus, the tool body 11 can properly hold the cutting insert 10 at three points other than the cutting parts 50 to 53.

As illustrated in FIG. 11, the center C3 of the screw hole 110 of the tool body 11 is shifted from the center C1 of the fixing hole 22 of the cutting insert 10, and the cutting insert 10 can be fixed to the tool body 11 with the screw 12. In a state in which the lip 72-2 of the cutting part 52 used for the cutting insert 10 and the center C1 of the fixing hole 22 are disposed on the horizontal line H1, the center C3 of the screw hole 110 of the tool body 11 is shifted from the center C1 of the fixing hole 22 of the cutting insert 10 in a direction tilted at 0 degrees with respect to the vertically downward direction H2 or at an angle α4 of 45 degrees or less toward the center C2 of the tool body 11. In this case, the cutting insert 10 can be pressed and fixed to the first holding part 101 with the screw 12. This allows the screw 12 and the first holding part 101 to sufficiently receive the load of a work material in the rotation direction, thereby reducing a load applied to the second holding part 102. Thus, the second holding part 102 can be reduced in thickness, thereby increasing the amount of protrusion (grooving amount) of the used cutting part 52 with respect to the tool body 11.

In a plan view of the distal end of the cutting tool 1 from the axial direction Z1 of the tool body 11, the cutting tool 1 is configured so as to fix the cutting insert 10 to the tool body 11 such that the virtual straight line H1 connecting the lips 72-2 and 72-4 of the two cutting parts 51 and 53, which are diagonally opposite to each other, is a horizontal line. Thus, in the cutting insert 10 including the four cutting parts 50 to 53, the lip of the second cutting part 51 to be used can be protruded to the highest degree from the tool body 11, thereby sufficiently obtaining a grooving amount.

The preferred embodiment of the present invention was described with reference to the accompanying drawings. The present invention is not limited to the example. It will be apparent to those skilled in the art that various changes or modifications can be made within the sprit described in the claims. It will be understood that such changes and modifications naturally belong to the technical scope of the present invention.

For example, the structures of the cutting insert 10 and the tool body 11 are not limited to those of the embodiment. For example, the first outer circumferential surface part 60 and the second outer circumferential surface part 61 of the cutting insert 10 are not always V-shaped. For example, the outer circumferential surface parts may be U-shaped. The present invention may be applied to a rotating cutting tool as well as a turning cutting tool.

INDUSTRIAL APPLICABILITY

The present invention is useful for providing a cutting insert and a cutting tool such that a tool body can sufficiently hold the cutting insert even if one of cutting parts is broken.

What is claimed is:
1. A cutting insert comprising:
two side surfaces opposed to each other;
a fixing hole passing through a center of each of the two side surfaces; and an outer circumferential surface that is disposed between outer circumferential edges of the two side surfaces and is connected to the outer circumferential edges of the two side surfaces, the outer circumferential surface including:

four cutting parts, each of the four cutting parts having a cutting face;

a first outer circumferential surface part disposed between a first cutting part and a second cutting part of the four cutting parts, the first and second cutting parts being adjacent to each other; and a second outer circumferential surface part that is opposed to the first outer circumferential surface part and is disposed between a third cutting part and a fourth cutting part of the four cutting parts, the third and fourth cutting parts being adjacent to each other, wherein, the first outer circumferential surface part is formed between the cutting face of the first cutting part and the cutting face of the second cutting part, and the second outer circumferential surface part is formed between the cutting face of the third cutting part and the cutting face of the fourth cutting part, in a side surface view in which the side surface is viewed from an axial direction of the fixing hole, the first outer circumferential surface part and the second outer circumferential surface part each have a V-shape with a center recessed toward the fixing hole; a virtual arc having the same diameter as a diameter of a circumcircle of the cutting insert is in contact with two points in each of the V-shapes of the first and second outer circumferential surface parts as tangent points;

the virtual arc is arranged so as to contact the V-shape of each of the first and second outer circumferential surface parts from outside of a respective one of the first and second outer circumferential surface parts such that the respective one of the first and second outer circumferential surface parts is closer in a radial direction of the fixing hole to a center of the fixing hole than the virtual arc except for the tangent points; and a center of the virtual arc is on a first center line, the first center line passing through the center of the fixing hole and being positioned so that the first and second outer circumferential surface parts are linearly symmetrical with each other with respect to the first center line, in a case where the two virtual arcs having the same diameter as the diameter of the circumcircle of the cutting insert are disposed in contact with the first outer circumferential surface part and the second outer circumferential surface part, respectively, a distance between the centers of the two virtual arcs is 150% or less of the diameter of the circumcircle of the cutting insert, and the first outer circumferential surface part and the second outer circumferential surface part have an angle of aperture of 140 degrees or more and 150 degrees or less.

2. The cutting insert according to claim 1, wherein the fixing hole has a hole diameter that is 30% or less of the diameter of the circumcircle of the cutting insert.

3. The cutting insert according to claim 1, wherein the cutting insert has a first length in a direction connecting a lip of the first cutting part and a lip of the fourth cutting part, the cutting insert has a second length in a direction connecting the lip of the first cutting part and a lip of the second cutting part, the first length is 70% or less of the diameter of the circumcircle of the cutting insert, and the second length is 95% or less of the diameter of the circumcircle of the cutting insert.

4. The cutting insert according to claim 1, wherein the cutting part has a clearance angle of 10 degrees or greater.

5. The cutting insert according to claim 1, wherein the side surface has first parts including side surfaces of the four cutting parts and second parts that are located near the fixing hole on the first parts so as to protrude relatively higher than the first parts, and the second parts have an outer face forming a second flank, the second flank having a clearance angle of 5 degrees or greater.

6. A cutting tool comprising:

the cutting insert according to claim 1; and a tool body to which the cutting insert is to be fixed.

7. The cutting tool according to claim 6, wherein the tool body includes a first holding part that comes into contact with two points on one of the first outer circumferential surface part and the second outer circumferential surface part, and a second holding part that comes into contact with a point on the other of the first outer circumferential surface part and the second outer circumferential surface part.

8. The cutting tool according to claim 7, wherein the first holding part has an arc face protruding toward the second holding part.

9. The cutting tool according to claim 7, wherein the second holding part has an arc face protruding toward the first holding part.

10. The cutting tool according to claim 6, wherein the tool body has a screw hole, the cutting insert is fixed to the tool body with a screw inserted into the fixing hole and the screw hole, and in a plan view of a distal end of the cutting tool from an axial direction of the tool body, a center of the screw hole of the tool body is shifted from a center of the fixing hole of the cutting insert, the cutting insert is fixable to the tool body with the screw, and the center of the screw hole of the tool body is shifted from the center of the fixing hole of the cutting insert in a direction tilted at 0 degree with respect to a vertically downward direction or at an angle of 45 degree or smaller toward a center of the tool body in a state in which a lip of one of the four cutting parts used for the cutting insert and the center of the fixing hole are disposed on a horizontal line.

11. The cutting tool according to claim 6, wherein in a plan view of the distal end of the cutting tool from the axial direction of the tool body, the cutting insert is fixable to the tool body such that a virtual straight line connecting lips of two of the four cutting parts is a horizontal line, the two cutting parts being diagonally opposite to each other.

12. The cutting insert according to claim 1, wherein the distance between the centers of the two virtual arcs is 143% or more and 147% or less of the diameter of the circumcircle of the cutting insert.

13. The cutting insert according to claim 1, wherein the cutting insert has a first length in a direction connecting a lip of the first cutting part and a lip of the fourth cutting part, the cutting insert has a second length in a direction connecting the lip of the first cutting part and a lip of the second cutting part, and the first length is 70% or more and 75% or less of the second length.

14. The cutting insert according to claim 3, wherein
the first length is 65% or more and 70% or less of the diameter of the circumcircle of the cutting insert, and
the second length is 85% or more and 95% or less of the diameter of the circumcircle of the cutting insert.

15. The cutting insert according to claim 5, wherein
each of the second parts has an outer face on an outer circumferential edge of the second part, and
the outer faces are vertical surfaces raised substantially perpendicular to the second parts.

* * * * *